Nov. 5, 1940.  W. H. VOGT  2,220,590
ADJUSTING KNOB
Filed July 19, 1939
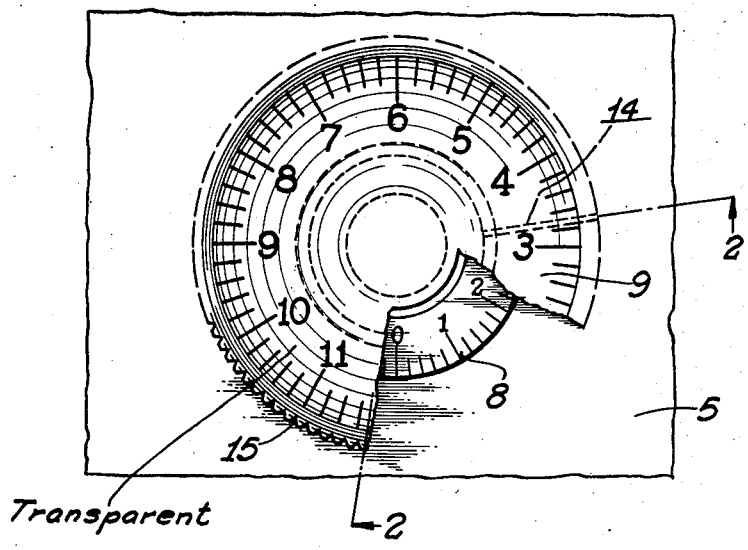
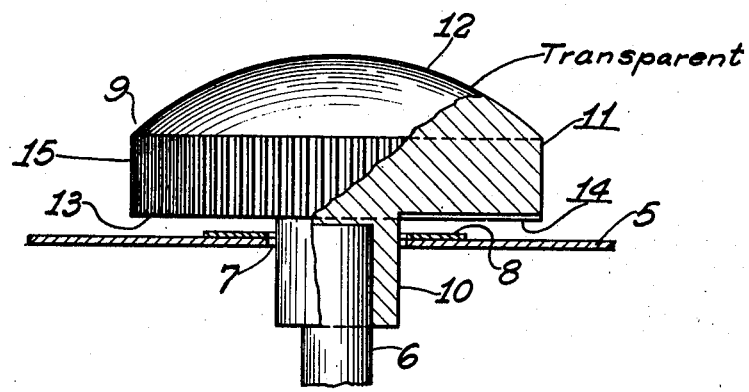
INVENTOR.
WILLIAM H. VOGT
BY D. Clyde Jones
ATTORNEY.

Patented Nov. 5, 1940

2,220,590

UNITED STATES PATENT OFFICE 2,220,590

ADJUSTING KNOB

William H. Vogt, Rochester, N. Y., assignor to Taylor Instrument Companies, Rochester, N. Y., a corporation of New York Application July 19, 1939, Serial No. 285,388

8 Claims. (Cl. 116—124.2)

In the manual adjustment of many devices it is customary to indicate the amount of adjustment of a given part by the relative movement between a graduated scale or dial and a suitable index or reference line. Where a high degree of accuracy in adjustment is desired, it has been the practice to provide a relatively large graduated dial and an index to cooperate therewith, either the index being movable with the part to be adjusted and the graduated dial being fixed or vice versa. In many instances, however, a large dial is not convenient, but attempts to reduce the dial size have resulted in crowding the graduations so closely together that accuracy in dial readings have been difficult to attain.

It is therefore the purpose of the present invention to reduce substantially the size of the graduated scale or dial and yet enable it to be read with as much ease and with as great a degree of accuracy as where the usual large-size scales are employed.

In accordance with the main feature of the present invention, there is provided an adjusting knob of transparent material having a disc-like part to be manually gripped, the surfaces of the disc-like part having a lens contour in the portion thereof superimposed over the scale portion to be read.

Another feature of the invention relates to a magnifying lens attached to an adjustable shaft in such a position that the lens not only serves to magnify the graduations on the indicating scale but also functions as a knob whereby the shaft may be adjusted.

The various other features and advantages of the invention will appear from the detailed description and claims when taken with the drawing in which Fig. 1 is a front elevation of a portion of an instrument in which the magnifying knob of the present invention is utilized for purposes of adjustment, a portion of the knob being broken away to show the underlying scale and Fig. 2 is a side view thereof, a portion of the knob being broken away to the line 2—2 of Fig. 1.

In the drawing the numeral 5 designates a front plate or member of an instrument having a part or shaft 6 to be adjusted. This shaft which is accessible or projects through an opening 7 in the plate, is connected to a movable part (not shown) of a unit to be adjusted, for example, the movable plates of a tuning condenser employed in a radio signaling system.

For the purpose of indicating the amount of adjustment of the shaft 6, a graduated dial or scale 8 is provided on the front of the plate 5 in symmetrical relation to the opening 7 therein. The shaft 6 is manually adjustable by a knob 9 comprising a stem 10 for connection to the shaft 6 and a disc-like portion 11 having its lower surface parallel to the front surface of plate 5 and at right angles to the stem with which it is concentric. The knob is preferably made of transparent material, such as plastic, glass or the like, although it will be appreciated that only the margin of the disc-like portion need be transparent. The upper surface 12 of the disc is convex, while its lower surface 13 is generally a plane surface so that the knob functions as a plano-convex lens which is superposed above the scale 8. While a specific type of lens has been disclosed it will be understood that the knob may have various lens contours provided it serves to magnify the graduations on the scale 8. By referring to Fig. 1, it will be noted that graduations and figures visible through the convex surface 12 of the knob are substantially larger than the unmagnified graduations and figures on the exposed portion of the scale 8 where a portion of the knob has been broken away.

In the present instance, the plane surface of the lens is provided with a radial reference line 14, etched, scratched or painted thereon and which cooperates with the mentioned graduations on the dial 8 to indicate the adjustment of the shaft. However, it will be understood that the graduated dial 8 may be mounted on the plane surface 13 of the knob and the reference mark on line 14 may be provided on the front of the plate 5. For convenience in adjustment, the knob is provided with an abrupt, knurled edge 15 which can be readily gripped manually. Although greater magnification of the graduations on the scale 8 is obtained when the lens surface 13 of the knob is rather widely spaced from the front of the plate, it is preferred to make the space of the order of one-sixteenth of an inch, since greater spacing tends to introduce a possible error in the scale reading due to parallax.

While the knob as herein disclosed has been provided with a stem for attaching it to a shaft to be adjusted, it will be understood that the stem may be omitted, in which case the disc-like portion of the knob is connected directly to the shaft.

I claim:

1. An adjusting knob comprising a disc of transparent material having one convex surface and an opposing generally plane surface, and means at the center of said plane surface for attaching said knob to a shaft to be adjusted, said disc having at least one graduation thereon for movement with respect to at least one graduation on a fixed part adjacent said shaft, at least one of said graduations being visible through said disc.

2. An adjusting knob comprising a disc of transparent material having one convex surface and an opposing generally plane surface, and means on said plane surface and at the center thereof for attaching said knob to a shaft to be adjusted, said disc having at least one graduation thereon for movement with respect to at least one graduation on a fixed part adjacent said shaft, at least one of said graduations being visible through said disc, said disc terminating in an abrupt edge capable of being gripped by the hand of an operator.

3. An adjusting knob of mushroom-like shape comprising a cap and a stem, the entire margin of said cap having lens contours and being made of transparent material, said stem being located at the optical center of said cap and being connectible to a shaft to be adjusted, said knob having at least one graduation thereon for movement with respect to at least one graduation on a fixed part adjacent said shaft, said graduations being visible through said transparent margin.

4. An adjusting knob comprising a disc having a lens-like, marginal portion of transparent material and a stem projecting at right angles from the center of one surface of said disc for connection with a shaft to be adjusted, said portion comprising a spherical surface and an opposing generally plane surface, one of said surfaces having at least one graduation thereon for movement with respect to at least one reference line on a fixed part adjacent said shaft.

5. An adjusting knob comprising a disc having a transparent marginal portion, said portion comprising a spherical surface and an opposing plane surface, a reference line on said disc extending radially thereof and a stem projecting at right angles from one surface of said disc for connection with a shaft to be adjusted.

6. In combination with a device having a member with an opening therethrough and a shaft adjustable through said opening, a graduated scale on said member adjacent said opening, a knob attached to said shaft, said knob having a plano-convex disc-like part provided with a transparent margin, the margin of said part being superimposed over said scale, and a reference element carried by said part in superimposed relation to said scale.

7. An adjusting knob for a shaft or the like, comprising a disc with a lens-like marginal portion of transparent material, said lens-like portion having a plane surface and an opposing spherical surface, means for attaching said disc to said shaft with the principal plane of said disc at right angles to the axis of said shaft, said portion having at least one graduation thereon for movement with respect to at least one graduation on a fixed part adjacent said shaft.

8. An adjusting knob comprising a disc substantially the entire margin of which has a magnifying lens-like portion of transparent material, means for attaching said knob to a shaft to be adjusted, a reference element in fixed registry with the lens-like portion of said knob, said reference element being movable with said knob with respect to at least one reference element on a fixed part adjacent said shaft, said last-mentioned reference element being visible through said lens-like portion.

WILLIAM H. VOGT.